United States Patent [19]

Sakai et al.

[11] 3,710,038

[45] Jan. 9, 1973

[54] MAGNETIC HEAD WITH TAPE CONTACTING GUARD SURFACE AND POLE TIPS OF SIMILAR FERRITE MATERIALS

[75] Inventors: Yoshio Sakai, Yokohama; Zenkichi Nakamura, Miyagi-gun; Katsumasa Takahashi; Naotoshi Sasada, both of Tokyo, all of Japan

[73] Assignee: Sony Corporation, Tokyo, Japan

[22] Filed: Feb. 25, 1971

[21] Appl. No.: 118,659

Related U.S. Application Data

[62] Division of Ser. No. 768,324, Oct. 17, 1968, Pat. No. 3,598,925.

[30] Foreign Application Priority Data

Oct. 18, 1967 Japan ..........................42/67040

[52] U.S. Cl. ..........................................179/100.2 C

[51] Int. Cl. ..........G11b 5/22, G11b 5/14, G11b 5/40

[58] Field of Search..........174/100.2 C; 340/174.1 F; 346/74 MC

[56] References Cited

UNITED STATES PATENTS 3,598,925 8/1971 Sakai et al. ....................179/100.2 C
3,417,386 12/1968 Schneider......................179/100.2 C
3,249,700 5/1966 Duinker et al.................179/100.2 C
2,850,582 9/1958 Raemy..........................179/100.2 C

OTHER PUBLICATIONS

Cook et al., "Magnetic Transducer Head," I.B.M. Tech. Disc. Bull., Vol. 8, No. 8, January 1966, pg. 1,032.

*Primary Examiner*—Bernard Konick
*Assistant Examiner*—Robert S. Tupper
*Attorney*—Hill, Sherman, Meroni, Gross & Simpson

[57] ABSTRACT

A magnetic head for video tape recorders having adjacent its ferrite pole tips a guard member of a similar ferrite material providing a tape contact surface having a hardness substantially equal to or a little less than that of the pole tips over the operating temperature range, but which guard material is substantially non-magnetic under working conditions. It is preferred to have the physical properties of the material of the guard member such as friction factor, coefficient of thermal expansion and the like similar to those of the pole tip material.

1 Claim, 9 Drawing Figures

INVENTORS
Yoshio Sakai, Zenkichi Nakamura
Katsumasa Takahashi, Naotoshi Sasada
BY Hill, Sherman, Meroni, Gross & Simpson ATTORNEYS

PATENTED JAN 9 1973

3,710,038

INVENTORS
Yoshio Sakai, Zenkichi Nakamura,
Katsumasa Takahashi, Naotoshi Sasada
BY Hill, Sherman, Meroni, Gross & Simpson ATTORNEYS

MAGNETIC HEAD WITH TAPE CONTACTING GUARD SURFACE AND POLE TIPS OF SIMILAR FERRITE MATERIALS

CROSS-REFERENCE TO RELATED APPLICATION

The present application is a division of our copending application Ser. No. 768,324, and now U.S. Pat. No. 3,598,925, filed Oct. 17, 1968, and the disclosure of said copending application is incorporated herein by reference in it entirety.

SUMMARY OF THE INVENTION

This invention relates to a magnetic head, and particularly to a guard member for magnetic heads used with video tape recorders.

Generally, in video tape recorders the relative speed of the magnetic head and magnetic tape is as high as 15 to 40 meters per second, which is approximately 100 times as high as that in audio magnetic tape recorders. In video tape recorders the contact pressure exerted on the surface of the magnetic head which is in contact with the magnetic tape is extremely high so that the high relative speed between the head and tape causes appreciable abrasion of the head-tips of the magnetic head. The realization of long-lived magnetic heads has long been a problem in the art.

Although the abrasion of the head-tips is different depending upon the material used, (examples being aluminum-iron system alloy, aluminum-silicon-iron system alloy or other various ferrites), the abrasion of the head-tips formed of such materials is remarkedly great when contacted with the magnetic tape without using any guard member. This abrasion of the head-tips results in the shortening of the life of the magnetic head.

In order to solve the problem, an attempt to decrease the abrasion loss of the head-tips has been made in the art by providing a protective member (the so-called guard member) in the vicinity of the head tips which member is formed of a non-magnetic alloy to have substantially the same area as the tape contact surface of the head-tips so as to increase the tape contact area of the magnetic head and hence decrease the tape contact pressure per unit area thereon. Brass, german silver, beryllium copper or the like has been employed as the material of the guard member.

However, the protective member formed of such a material and provided in the vicinity of the head-tips does not so much serve to decrease the abrasion loss of the head-tips as expected and, in addition to this, the use of such a protective member for a certain period introduces a degradation of the contact of the magnetic head with the magnetic tape and a damaging of the head-tips and the magnetic surface of the magnetic tape, which is likely to cause the so-called tape clogging with insufficient recording and lowering of the high-frequency component of the output from the magnetic head.

Further, it has been found that since the relative speed of the magnetic tape and the magnetic head is extremely high in usual video tape recorders as mentioned above, the mean temperature of the tape contact surface of the magnetic head due to friction between the head and the tape reaches as high as 400° C or so and that although the temperature change depends upon the material of the magnetic head and the type of video tape recorder used, the temperature is very high. Moreover, in a video tape recorder employing a rotary magnetic head the magnetic head runs into and out of contact with the magnetic tape at every revolution, and it is considered that at the instant the magnetic head comes in contact with the magnetic tape the temperature of frictional heat of the surface layer of the magnetic head contacting the magnetic tape goes up to more than 2 or 3 times the mean temperature of the frictional heat of the magnetic head during a complete revolution.

At such high temperature the hardness of the materials of a conventional guard member such as brass, german silver, beryllium copper and so on is remarkedly reduced, as compared with the material of the head-tips. Consequently, especially at high temperature the abrasion loss of the guard member formed of one of the aforementioned materials is appreciably greater than that of the head-tips to cause the head-tips to project further than the guard member, so that the guard member does not substantially perform the function of perventing wear of the head-tips and the expected long life of the magnetic head cannot be attained.

Based on the foregoing understanding of the underlying problems, the present invention achieves a magnetic head for video tape recorders which is appreciably more long-lived and overcomes the drawbacks just referred to.

Namely, in accordance with this invention at least the tape contact surface of the guard member is formed of a material whose Vickers hardness exceeds 300 at room temperature and 250 at 200° C and which is substantially non-magnetic at room temperature and under working conditions. In this case it is preferred that the head-tips and the guard member are substantially uniform in the temperature-hardness characteristics or in the tendency or slope of the characteristics. Further, it is desirable to select the hardness of the guard member to be equal to or lower than that of the head-tips at the temperature of the tape contact surface of the head-tips under working conditions. This is because of the fact that if the hardness of the protective member is too much greater than that of the head-tips at room temperature and under working conditions, the head-tips are worn away more than the guard member to draw back its gap surface from the plane of the tape contact surface of the guard member which results in incomplete contact of the head-tips with the magnetic tape to lower the high-frequency component of the output from the magnetic head.

Therefore, the best material for the guard member would be the same as for the head-tips, but a magnetic material is not suitable for the guard member material. However, it has been found that if the composition of the material for the head-tips is altered to have its Curie point lower than room temperature, the material becomes non-magnetic under working conditions and yet the material is similar in its physical properties to the material for the head-tips and is most suitable for the guard member.

Accordingly, one object of this invention is to provide a long-lived magnetic head with a specific guard surface thereon.

Another object of this invention is to provide a magnetic head which employs a guard member formed of a material whose Vickers hardness exceeds 300 at room temperature and 250 at 200° C.

A further object of this invention is to provide a magnetic head which employs a guard member formed of a material which is similar in composition to the material for the head-tips and is non-magnetic at a temperature exceeding the working temperature.

Another object of this invention is to provide a magnetic head having a guard member formed of ferrite which is similar to the material of the head-tips but different therefrom in composition.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DETAILED DESCRIPTION OF THE PREFERRED EMBODIMENT

Figure 1:
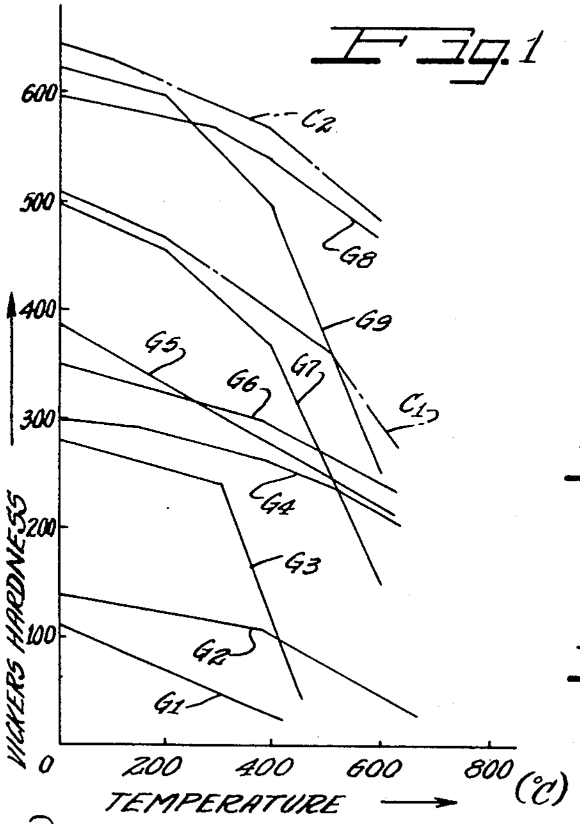
FIG. 1 is a graph showing the temperature-hardness characteristics of materials for the head-tips and of materials for the guard member of a prior art magnetic head for video tape recorders and a magnetic head for video tape recorders produced according to this invention.

The temperature-hardness characteristics of brass, german silver and beryllium copper which have been used to make the guard member of conventional magnetic heads become as indicated by curves $G_1$, $G_2$ and $G_3$, respectively, in FIG. 1. The curve $G_3$ shows the characteristics of beryllium copper hardened at 300° C.

Referring to FIG. 1, curve $C_1$ illustrates the temperature-hardness characteristics of "S-alloy" for one example of an aluminum-iron system alloy or aluminum-silicon-iron system alloy. These alloys are usually made by casting, and an aluminum-silicon-iron system alloys for the head-tips have compositions by weight consisting essentially of 5 percent to 8 percent aluminum, 8 percent to 11 percent silicon, and 81 percent to 86 percent iron as shown in the Great Britain Pat. No. 989,500.

S-alloy is a ternary alloy formed in an as cast condition for a magnetic head and having an approximate composition of from 5 percent to 6 percent by weight aluminum, from 9 percent to 10 percent by weight silicon, and about 85 percent by weight iron. S-alloy used for experiment (curve $C_1$) has a composition consisting of 6 percent by weight of aluminum and 9 percent by weight of silicon, 84 percent by weight of iron and 1 percent by weight of impurities, for example titanium and niobium, which are available for control hardness and magnetic characteristics thereof. The magnetic head with S-alloy head tips has, for example, the construction shown in Matsumoto U.S. Pat. No. 3,335,412 issued Aug. 8, 1967 (based on a U.S. application filed Sept. 31, 1963) and may be formed by the method disclosed in Matsumoto U.S. Pat. No. 3,302,271 issued Feb. 7, 1967 (based on a U.S. application filed Nov. 20, 1962). These patents were filed by a common assignee of this invention.

Curve $C_2$ in FIG. 1 shows the temperature-hardness characteristics of a ferrite, specifically manganese-zinc ferrite (containing 50 mol per cent of iron oxide, 40 mol per cent of manganese oxide and 10 mol per cent of zinc oxide). The head tips of the ferrite used for experiments are made of single crystal ferrites and a construction of the head is disclosed in copending U.S. application Nobutoshi Kihara et al., Ser. No. 509,029 filed in Nov. 22, 1965, (now abandoned) and having a common assignee herewith.

As appears from FIG. 1 the hardness of brass (curve $G_1$), german silver (curve $G_2$), and beryllium copper (curve $G_3$) which are employed as materials for the guard member is appreciably lower than that of the material for the head-tips (curves $C_1$ and $C_2$). Especially in the case of, for example, beryllium copper (curve $G_3$) its hardness greatly decreases at a temperature exceeding 300° C, and the difference in hardness from the material of the head-tips at high temperature is considerably greater than that at room temperature. It has been found that in a magnetic head having head-tips formed of S-alloy (having a hardness as represented by curve $C_1$) and a guard member formed of german silver (curve $G_2$), the head-tips project about 0.1 to 0.3 microns from the guard member after being used for several hours. It is considered that the drawbacks described in the introduction are caused by too much wear of the guard member as compared with the head-tips.

Figure 2:
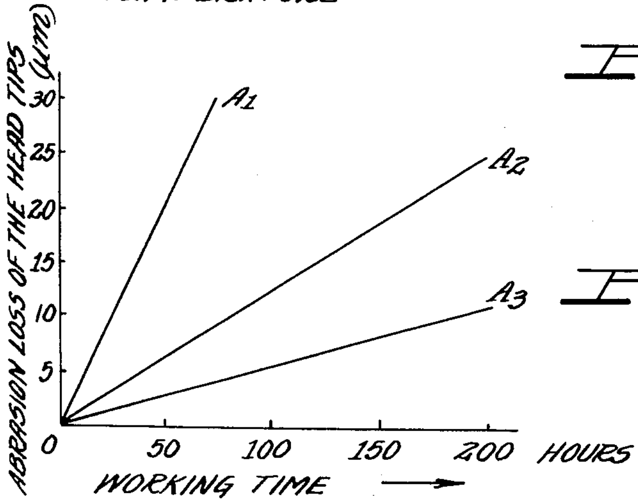
FIG. 2 is a graph showing the abrasion loss in millimicrons of the head-tips of a conventional magnetic head for video tape recorders and of a magnetic head for video tape recorders produced according to this invention, with respect to the working time in hours of the respective magnetic heads.
Figure 5:
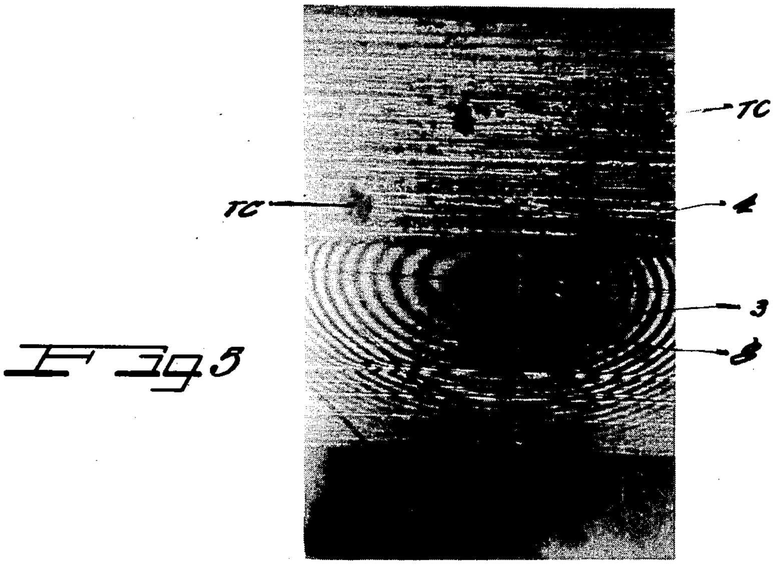
FIGS. 5 and 6 are respective microphotographs showing wornaway conditions of the tape contact surface of magnetic heads as viewed through an interference microscope.
Figure 6:
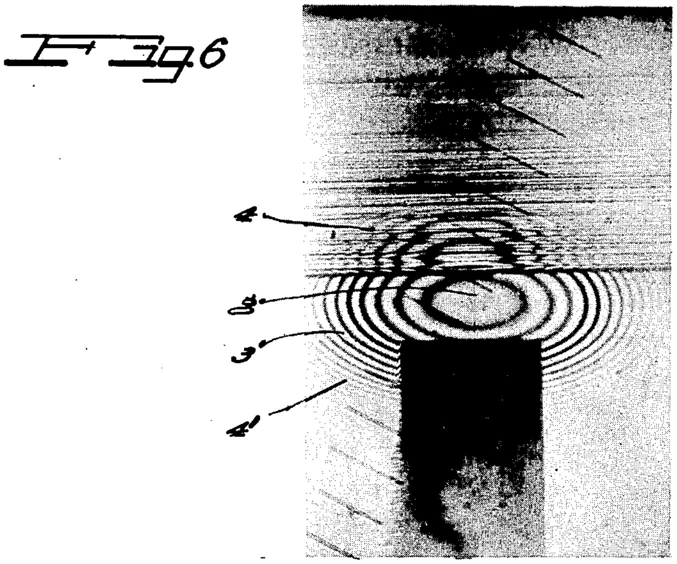

In order to prolong the life of the head-tips by the use of the guard member formed of such a material, the contact area of the guard member with the magnetic tape must be greatly increased. The abrasion loss of a magnetic head having head-tips formed of, for example, S-alloy but not having guard member relative to the working time of the magnetic head is as indicated by a curve $A_1$ in FIG. 2. In this case the contact area of the head-tips with the magnetic tape is 0.3 mm.$^2$ (3/10 square millimeter). A curve $A_2$ in FIG. 2 indicates the abrasion loss of the head-tips formed of S-alloy and mounted on a magnetic head employing a guard member made of german silver, relative to the working time of the magnetic head. In order to reduce the abrasion loss in the latter case (curve $A_2$) to one-third of that in the former case (curve $A_1$), the total tape contact area of the magnetic head must be increased to 12 mm.$^2$ which is 40 times the tape contact area of the magnetic head without the guard member. However, an increase in the tape contact area of the magnetic head is likely to cause insufficient contact of the magnetic head with the magnetic tape introducing a difficulty in stable recording or reproducing and hence lowering the high-frequency component of the output from the magnetic head.

Further, the hardness of the guard member remarkedly lowers under the high temperature conditions mentioned in the introduction, and consequently the tape contact surface of the guard member is badly scratched or roughened by the magnetic powder of the magnetic tape which has a greater hardness than the guard member. The magnetic powder of the magnetic tape, or dust adheres to the scratched or roughened tape contact surface of the guard member, by which the tape is, in turn, damaged, to cause the so-called clogging, with failure of recording, lowering of the high-frequency component of the output from the head or failure of producing an output from the magnetic head.

In view of the foregoing it is preferred to form the guard member of a material whose Vickers hardness exceeds 300 at room temperature and 250 at 200° C and which exhibits substantially non-magnetic property (is substantially non-magnetic) at room temperature and under working conditions of the magnetic head.

Further, it is desirable that the guard member be formed of a material of good workability, high thermal conductivity and excellent thermal radiation so as to radiate from the tape contact surface heat produced by friction between the magnetic head and tape. Accordingly, the material of the guard member is further preferred to have physical properties such as friction factor, coefficient of thermal expansion and so on similar to those of the head-tips material. From this point of view, the material of the guard member is desired to be identical in composition with the head-tips material. For example, when the head-tips material is an iron-manganese-zinc material (manganese-zinc ferrite), the material of the guard member may also be an iron-manganese-zinc material (manganese-zinc ferrite).

However, in order to improve the S/N ratio (signal to noise ratio) of the magnetic head, the reluctance of the leakage paths from the head-tips to the guard member should be substantially greater than the reluctance of the coupling gap, so that the guard member is required to be formed in a manner to exhibit substantially non-magnetic property (that is to be substantially non-magnetic) at room temperature and under working conditions.

In the case where the head-tips material is an iron-manganese-zinc ferrite, a ferrite of the same system is preferred for the material of the guard member. It is preferred for manufacturing that the guard material of the ferrite may be formed by sintering. When the iron-manganese-zinc ferrite contains less than 30 mol per cent of zinc oxide and 50 mol per cent of iron oxide, the ferrite exhibits magnetic property (is magnetic) at room temperature and under working conditions, so that the amount of the zinc oxide must be increased to exceed 30 mol per cent when the iron oxide is 50 mol per cent. For example, when the head-tips are made of a manganese-zinc ferrite containing 50 mol per cent of $Fe_2O_3$, 40 mol per cent of MnO and 10 mol per cent of ZnO and having such temperature-hardness characteristics as indicated by a curve $C_2$ in FIG. 1, a zinc ferrite containing 50 mol per cent of $Fe_2O_3$, 10 mol per cent of MnO and 40 mol per cent of ZnO and having such temperature-hardness characteristics as indicated by a curve $G_8$ in FIG. 1 is very suitable for use as the material of the guard member.

In accordance with this invention the Vickers hardness of the guard member exceeds 300 at room temperature and 250 at 200° C, so that although the temperature of the tape contact surface of the magnetic head for video tape recorders becomes appreciably high under working conditions as described above, the guard member is not rapidly worn away and performs its full function to ensure the long life span of the magnetic head. Further, there is no possibility of causing the so-called tape clogging which results from damaging of the tape contact surface of the guard member with the magnetic powder of the magnetic tape.

In addition, since the magnetic head of this invention employs the guard member of excellent abrasion resistance as described above, its tape contact area can be made very much smaller than that of a magnetic head using the conventional guard member. Therefore, there is one possibility that the contact condition of the magnetic head with the magnetic tape will deteriorate to prevent satisfactory recording or playback and hence lower the high-frequency component of the output from the magnetic head. The abrasion loss of the head-tips, formed of S-alloy, of the magnetic head of this invention having the guard member formed of the aluminum-iron alloy containing 30 percent by weight of aluminum and 70 percent by weight of iron, relative to the working time, is as indicated by a line $A_3$ in FIG. 2 and the abrasion loss of the head-tips is reduced by half, as compared with that in the case of using the conventional guard member formed of german silver indicated by a line $A_2$ in FIG. 2. Further, the tape contact area in this case may be 3 $mm.^2$ which is a quarter of 12 $mm.^2$ of the magnetic head having the guard member of german silver, so that the tape contact area can be extremely reduced, as compared with that of the conventional magnetic head.

Figure 3:
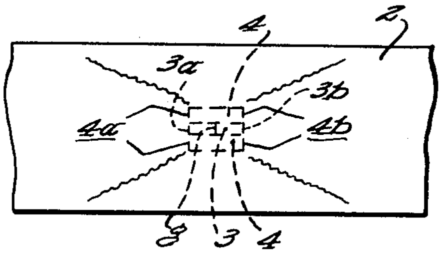
FIG. 3 is a schematic diagram illustrating the contact condition with a magnetic tape of a magnetic head for video tape recorders.
Figure 4:
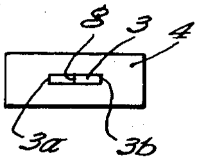
FIGS. 4, *4a*, *4b* and *4c* are schematic diagrams illustrating examples of the tape contact surface of the magnetic head produced according to this invention.
Figure 4A:
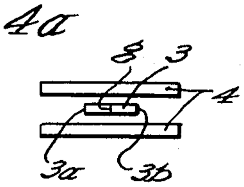
Figure 4B:
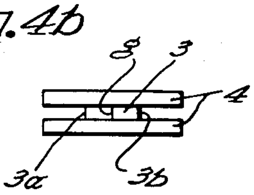
Figure 4C:
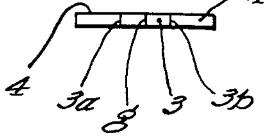

A description will hereinafter be given of the relative arrangement and configuration of the aforementioned guard member and the head-tips. Assume that the magnetic head is caused to engage a magnetic tape 2 to effect recording thereon or reproducing therefrom. In the figure reference numeral 3 indicates head-tips of the magnetic head and 4 a tape contact surface of a guard member, and reference character *g* designates a coupling gap of the head-tips. Since the relative speed of the magnetic head to the magnetic tape 2 is extremely high in video tape recorders as described above, the contact pressure between the magnetic head and the magnetic tape 2 is very great, and further the tape contact area of the magnetic head is very small. Therefore, when the magnetic tape 2 is transported in contact with the magnetic head, the head contact portion of the magnetic tape 2 is caused to sink and the tape is caused to bulge by the contact pressure of the head, and the tape is transported while having the sinking (bulging) portion, with the result that vibration is produced in the magnetic tape 2 such as shown in FIG. 3 which is transmitted from the marginal portions of the tape contact surface of the guard member 4 of the magnetic head in diagonal directions relative to the marginal portions. In the present invention both ends 4*a* and 4*b* of the tape contact surface of the guard member 4 preferably project beyond both ends 3*a* and 3*b* of the tape contact surface of the head-tips 3 in directions substantially at right angles to the lengthwise direction (long-dimension) of the gap *g* of the head-tips 3, as illustrated in FIGS. 4, 4*a*, 4*b* and 4*c*. Of course, the tape contact surface of the guard member 4 near the head-tips is located in a manner to be substantially flush with the tape contact surface of the head-tips 3. FIGS. 4, 4*a*, 4*b* and 4*c* respectively show examples of the guard member 4. In FIG. 4 the guard member 4 is disposed in such a manner that its tape contact surface surrounds the tape contact surface of the head-tips 3 in contact with or in close proximity to its entire marginal edges (about the entire perimeter of the head-tips 3). FIGS. 4*a* and 4*b* illustrate examples in which the guard members 4 are provided on both sides of the head-tips 3 in the lengthwise direction of the coupling gap *g*. In FIG. 4*a* the tape contact surfaces of the guard members 4 are a little spaced from that of the head-tips 3, while in FIG. 4 *b* the tape contact surfaces of the guard members 4 are provided in contact with that of the head-tips 3. In either case the guard members respectively project from the both ends 3*a* and 3*b* of the tape contact surface of the head-tips in the direction of the movement of the magnetic head relative to the magnetic tape. FIG. 4*c* shows an example in which the guard members 4 are located on both sides of the head-tips 3 substantially at right angles to the lengthwise direction of the coupling gap *g* (that is at the leading and trailing sides of the pole-tips).

With such arrangements of the guard member as described above, even if the aforementioned vibration of the magnetic tape is caused due to the relative movement of the magnetic tape and the magnetic head, the vibration is rapidly damped on the tape contact surface of the magnetic head by the presence of the guard member 4 and is hardly transmitted to the tape portion lying at the coupling gap *g*. Consequently, the above vibration is not likely to render the contact condition of the tape portion at the gap unstable, and hence satisfactory recording or playback can always be achieved.

Where the zinc ferrite containing 50 mol per cent of iron oxide, 40 mol per cent of manganese oxide and 10 mol per cent of zinc oxide is used as the material of the head-tips (see curve $C_2$), the zinc ferrite containing 50 mol per cent of iron oxide, 10 mol per cent of manganese oxide and 40 mol per cent of zinc oxide which has the temperature-hardness characteristics (see curve $G_8$) quite similar to those of the zinc ferrite of the head-tips (curve $C_2$) is preferred rather than the alloy containing 40 percent by weight of aluminum and 60 percent by weight of iron (not heat-treated) (see curve $G_9$).

Thus, by selecting the temperature-hardness characteristics of the guard member to be substantially equal to, or a little less than (the guard member being a little less hard), those of the head-tips at room temperature and under working conditions, the abrasion losses of the guard member and the head-tips become substantially equal to each other to maintain the tape contact surfaces of the guard member and of the head-tips in flush relation and hence to greatly reduce the wear of the head-tips, thus assuring long life of the magnetic head.

Although the present invention has been described in connection with a magnetic head for video tape recorders, it is a matter of course that the invention is applicable to a magnetic head for high speed recording (longitudinal scan recording with high tape speed), such as data recording.

It will be noted that even if 400° C is the mean operating temperature of the tape contacting surface of the head, for example, each of the guard materials represented by curves G4, G5, G6, G7, G8 and G9 provides a Vickers hardness which exceeds 250 at such mean operation temperature.

Referring to FIG. 1, it will be observed that the hardness of the ferrite material of the head-tips as represented by curve $C_2$ is slightly greater than the hardness of the ferrite material of the guard member as represented by curve G8 over a substantial temperature range extending up to about 600° C. As seen in FIGS. 4, 4*a*, 4*b* and 4*c*, the guard member has a tape contact surface 4 which extends further than both ends 3*a* and 3*b* of the tape contact surface of the head-tips in a direction substantially at right angles to the plane of the coupling gap *g*.

It will be apparent that many modifications and variations may be effected without departing from the scope of the novel concepts of this invention.

We claim:

1. A magnetic head comprising head-tips of a magnetic ferrite material having a coupling gap for coupling thereof with a magnetic tape record medium and a guard member adjacent said head-tips, the head-tips and guard member having substantially flush tape contact surfaces disposed for contact with the magnetic tape record medium, said head-tips and said guard member both containing as a major constituent on a mol percent basis iron oxide, and both containing as a further substantial constituent zinc oxide, the guard member being formed of a sintered ferrite material having a substantially greater mol percent of zinc oxide than said head-tips such that the reluctance of the leakage paths from the head-tips to the guard member is substantially greater than the reluctance of the coupling gap, but the compositions of the ferrite materials of the head-tips and guard member being sufficiently similar that (1) the hardness of the tape contact surface of the guard member is equal to or slightly less than the hardness of the tape contact surface of the head-tips at the operating temperature of the head-tips under working conditions, and (2) the temperature-hardness characteristics of the tape contact surfaces of the head-tips and the guard member have substantially the same slope over a substantial temperature range extending at least from room temperature up to said operating temperature, the guard member further including a third constituent in common with said head-tips in a substantial amount on a mol percentage basis such that the ferrite material of the guard member contains less than 50 mol percent zinc oxide, but the amount of zinc oxide in the guard member material being more than 30 mol percent so that the Curie temperature is less than room temperature.

* * * * *